UNITED STATES PATENT OFFICE.

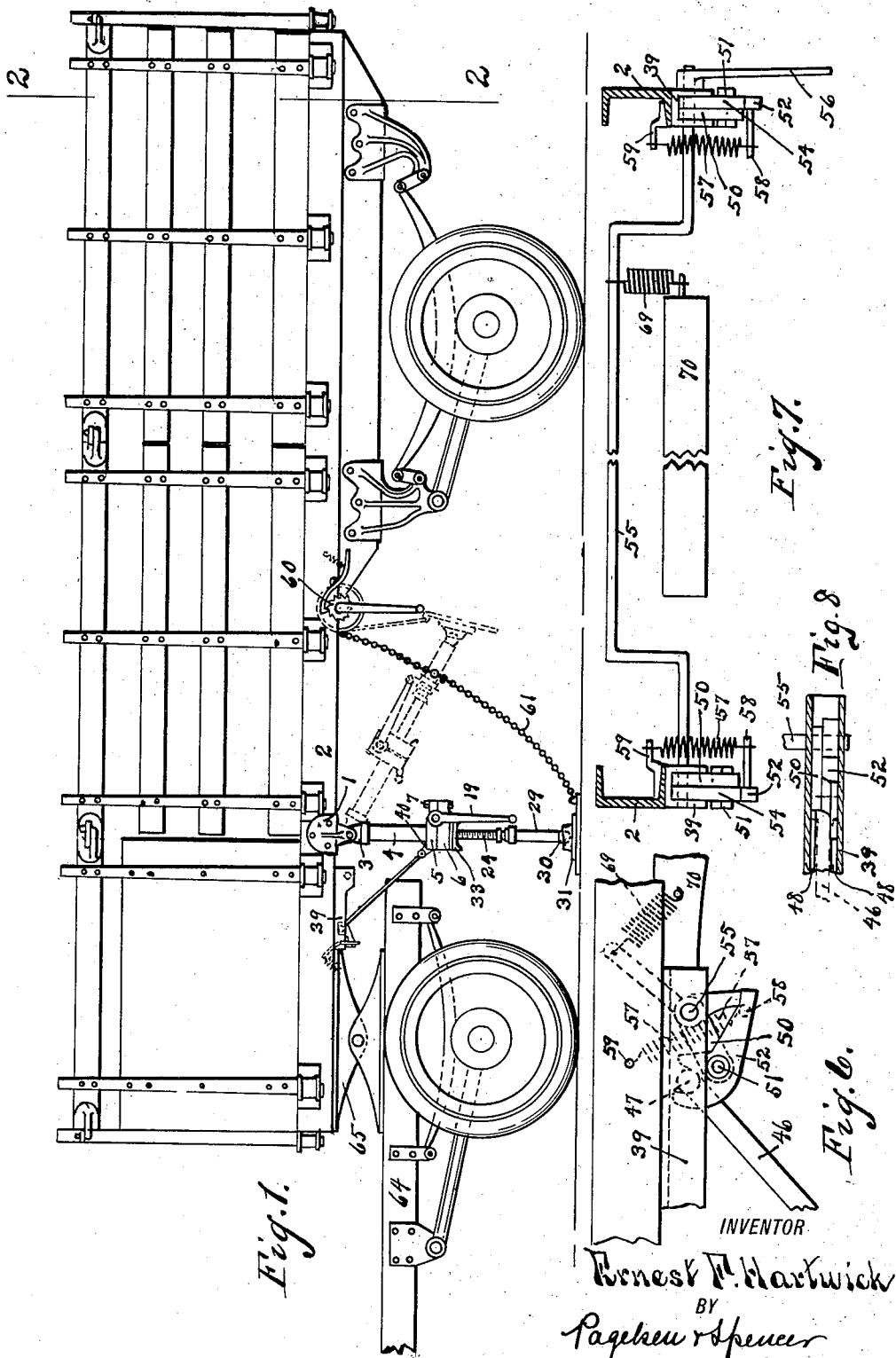
E. F. HARTWICK.
SUPPORTING JACK.
APPLICATION FILED FEB. 10, 1919.
1,313,087.
Patented Aug. 12, 1919.
2 SHEETS—SHEET 1.
INVENTOR
Ernest F. Hartwick
BY
Pagelsen & Spencer
ATTORNEYS

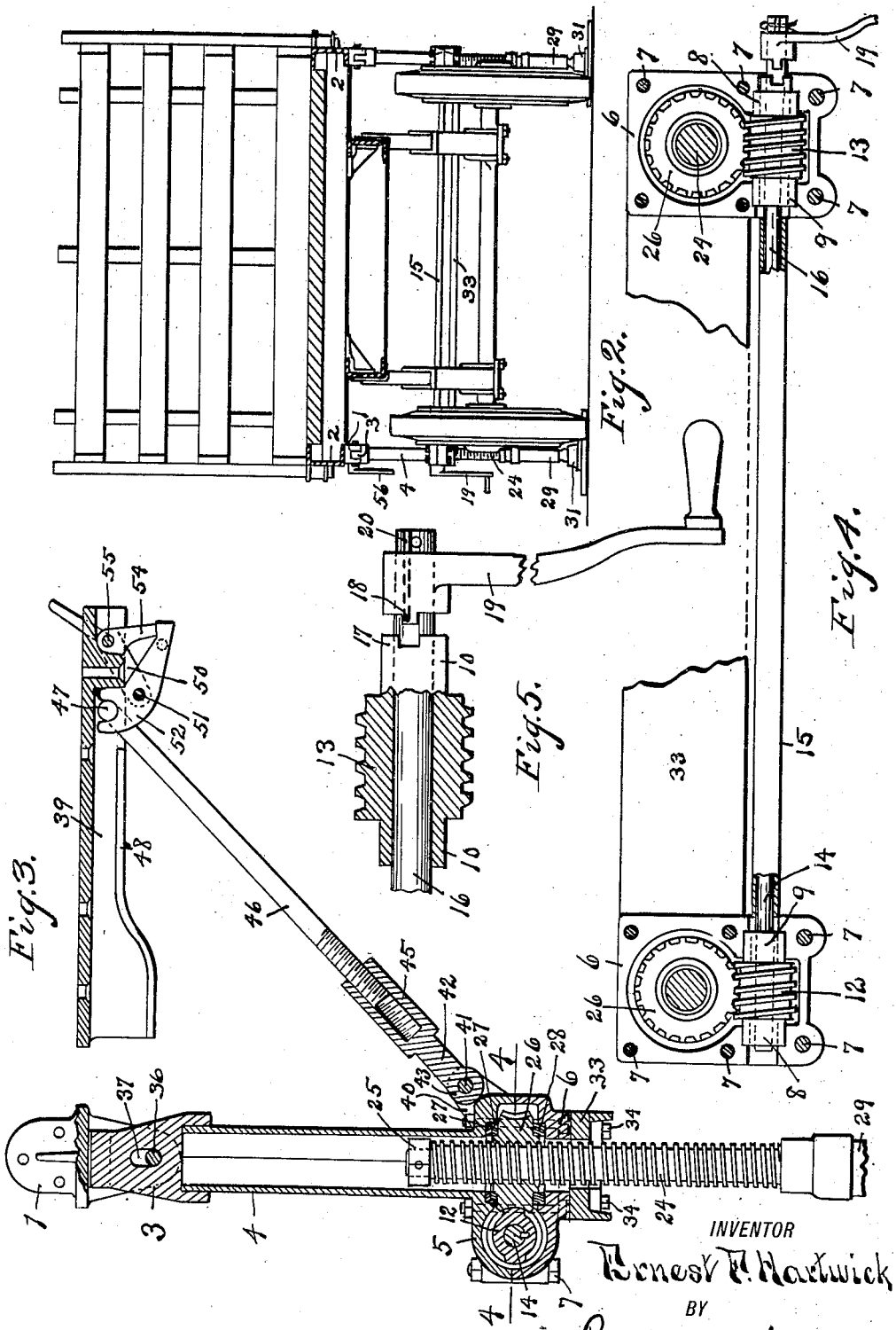

ERNEST F. HARTWICK, OF DETROIT, MICHIGAN, ASSIGNOR TO FRUEHAUF TRAILER COMPANY, OF DETROIT, MICHIGAN, A CORPORATION OF MICHIGAN.

SUPPORTING-JACK.

1,313,087.  Specification of Letters Patent.  Patented Aug. 12, 1919.

Application filed February 10, 1919. Serial No. 275,977.

*To all whom it may concern:*

Be it known that I, ERNEST F. HARTWICK, a citizen of the United States, and residing at Detroit, in the county of Wayne and State of Michigan, have invented a new and Improved Supporting-Jack, of which the following is a specification.

Trucks for carrying freight are expensive to construct, maintain and operate, each of them requiring an experienced chauffeur, and in many cases the loss of time required to load and unload renders the cost of operation prohibitive. This objection has been met in part by the use of four wheeled trailers hitched to motor trucks, and which, because of their relative cheapness and also because but one chauffeur is required for both the tractor and the trailer, reduce the cost of operation. A further step in economy is the use of two wheeled trailers or semi-trailers, that is, vehicles having two carrying wheels at one end and so constructed at the other end that they can be readily connected to tractors. A series of such semi-trailers can be operated in connection with a single tractor which is not intended to carry loads and can therefore be made very much lighter and is very much more easily handled than a load carrying tractor. These semi-trailers must be supported at their front ends during such times as they are disconnected from their tractor, and such supporting device forms the subject matter of this application.

This invention consists in a pair of normally disconnected jacks pivoted to the frame of the vehicle at the opposite end from the supporting wheels, said jacks being independently adjustable, in combination with means whereby one of the jacks can be lengthened or shortened independently of the other and whereby both jacks can be adjusted simultaneously.

It further consists in a plurality of novel devices for holding or locking the jacks in vertical position, said devices being adapted to be released by the actuation of a single lever.

It further consists in the details of construction shown in the accompanying drawings and particularly pointed out in the claims.

In the drawings, Figure 1 is a side elevation of a trailer equipped with this improved supporting mechanism. Fig. 2 is a section on the line 2—2 of Fig. 1. Fig. 3 is a longitudinal vertical section of one of the jacks and the locking mechanism therefor. Fig. 4 is a horizontal section on the line 4—4 of Fig. 3. Fig. 5 is a detail of a worm and crank handle. Fig. 6 is a side elevation of a locking device. Fig. 7 is a front elevation of the locking devices for the two jacks. Fig. 8 is a detail thereof.

Similar reference characters refer to like parts throughout the several views.

Referring to Figs. 1 and 3, a bracket 1 is connected to each side bar 2 of the frame of the vehicle and each bracket receives a head 3 into which the tubular member 4 of the jack extends and is secured. The lower end of the tubular member 4 is enlarged to constitute a housing for a worm and worm wheel, the housing being preferably in two parts 5 and 6 connected by means of screws 7. As shown in Fig. 4, this housing is formed with recesses to receive the bearing collars 8 and 9 and these bearing collars receive the hubs 10 of the two worms 12 and 13. The worm 12 is rigidly secured to a stub shaft 14 which is connected to a hollow shaft 15 into the opposite ends of which the stub shaft 16 is secured. This stub shaft 16 is freely rotatable in the worm 13, which is formed with one member 17 of a jaw clutch of which the other portion 18 is a part of the hub of the crank handle 19 which may be slidably secured to the stub shaft 16 by means of a key 20. See Fig. 5.

It will therefore be seen that when the crank handle is in the position shown in Fig. 4, the shafts 14, 15 and 16 and the worm 12 may turn together, the worm 13 remaining stationary. But when the crank handle is slipped inwardly until the clutch members 17 and 18 engage, the shafts and the two worms will turn simultaneously. The object of this construction is that when the worm 12 is turned independently of the worm 13 the jack controlled by the worm 12 will be lengthened or shortened independently of the other jack, so that the body of the vehicle may be leveled on irregular ground.

A screw 24 is provided with a square head 25 which loosely slides within the tubular member 4 and prevents the screw 24 from turning. On this screw is a combined nut and worm wheel 26 which is engaged by the worm 12 or 13. Bearing collars 27 and 28 may be positioned above and below the worm wheel 26 in proper sockets in the housing to receive the thrust of the screw. The lower end of the screw connects to a third member 29 which is preferably provided with a bearing ball 30 that fits in a proper socket in a foot 31. Extending across between the housings of the two jacks is a connecting beam or bar 33, preferably of channel shape, which is secured to the housings by means of screws 34.

A pin 36 in each bracket 1 extends through a slot 37 in the head 3. It will be noticed in Fig. 3 that the upper end of this head is flat and that this slot permits the upper end of the head to move away from the horizontal portion of the bracket when the jack is to be swung up to inclined position, but it also permits of good contact between the upper end of this jack and the supporting bracket.

Secured to each of the side bars 2 of the vehicle is a channel-shaped guide bar 39, such as shown in Fig. 3. Extending from the housing of the worm and worm wheel are a pair of lugs 40 carrying a pivot 41 for the lower end of a brace, preferably formed of a lower portion 42 having an eye 43 to receive the pivot 41, the part 42 being formed with a tubular internally threaded portion 45 which receives the rod 46. This rod is formed with a T-shaped head 47 which normally slides on the flanges 48 formed on the channel 39. Extending downwardly within the channel is a rigid bracket 50 which carries a pin 51 on which a lever 52 is mounted, which lever extends into the space left by cutting away a part of a flange 48 and has a notch to receive one side of the T-shaped head 47 at one side of the channel 39, as shown in Fig. 8. Pivoted at one end of each channel is a small dog 54 on the end of a transverse shaft 55 having on its outer end a small crank handle 56. Each dog 54 normally engages the lower arm of a lever 52, as shown in Fig. 3, and retains the parts in the position there shown. But when the dogs 54 are swung outwardly, that is, to the right in Fig. 3, the springs 57 which connect to the pins 58 on the lever 52 and to the small brackets 59, shown in Fig. 7, will swing up the long arm of this lever 52 and permit the head 47 on the rod 46 to be released.

When the brace has been released, the jacks can be swung upwardly to the position shown in dotted lines in Fig. 1 by means of a small windlass 60 on which the chains 61 may be wound. The construction of this windlass need not be described.

The operation of the mechanism is as follows: When the parts are as shown in solid lines in Fig. 1, the crank handle 19 will be turned until the front end of the trailer is lifted free of the tractor, the latter being indicated by a frame 64 and a fifth wheel 65. The trailer is connected to the upper portion of the fifth wheel in any desired manner and may be disengaged therefrom by elevating the front end of the frame of the trailer by means of the jacks. The tractor then moves away and the trailer is unloaded or loaded as may be desired, after which the tractor backs into the position shown in Fig. 1, whereupon the front end of the trailer is lowered into position by the turning of the crank handle 19. After the load is off the jacks, the small handle 56 is turned to release the dog 54, whereupon the jacks may be swung up to the position shown in Fig. 1 by means of the windlass 60.

When the chains 61 are released, the jacks will swing down to vertical position or until the heads 47 on the braces 46 engage in the notches in the levers 52 and swing them down to the position shown in Fig. 3. The spring 69 connected to the intermediate portion of the shaft 55 and to a portion 70 of the trailer will at once swing the dog 54 into engagement with the end of the lower arm of the lever 51, as shown in Fig. 3, and lock the parts in position.

The details and proportions of all of the parts shown in these drawings may be varied to meet the different requirements which may be met in wheeled vehicles without departing from the spirit of my invention set forth in the following claims.

I claim:—

1. The combination of a pair of supports, each embodying a screw and a nut, means to turn each nut, a shaft extending across between the supports, means to hold said supports in a predetermined relation to each other and a crank handle to turn the shaft to actuate one of the nut-turning means at all times, said handle being adapted to be moved into and out of operative engagement with the other nut-turning means.

2. The combination of a pair of supports, each embodying a screw and nut rotatable relative to each other, and hand operable means to effect such relative rotation of the screw and nut of one support alone or of both supports simultaneously as may be desired and means to hold said supports in a predetermined relation to each other.

3. The combination of a pair of supports, each comprising a tubular member pivoted to a vehicle frame at one end, a screw slidable therein, a foot plate connecting to the lower end of the screw by a universal joint, a combined worm-wheel and nut rotatably mounted on each tubular member, a rotatable worm in engagement with each worm-wheel, a shaft extending across between the worms and rigidly connected to only one of them, the other worm being free on the shaft, and a crank handle slidably secured upon said shaft and provided with means to engage the free worm at will.

4. The combination of a pair of supports pivoted to a vehicle frame, means to swing the same up toward the frame, braces pivoted to the supports and having heads at their outer ends, channels in which said heads are slidable, pivoted engaging members to receive and retain said heads, and means to hold said engaging members in retaining position.

5. The combination of a pair of supports pivoted to a vehicle frame, means to swing the same up toward the frame, braces pivoted to the supports and having heads at their outer ends, channels in which said heads are slidable, means to secure the heads in position, and latching devices to hold the securing means in operative position.

6. The combination of a pair of adjustable jacks pivoted to a vehicle frame, means to swing the same up toward the frame, a brace connected at one end to each jack, means to guide the opposite ends of said braces, a pivoted lever on each guide provided with notches to receive the guided end of a brace, springs to move said levers to disengaging position, dogs pivoted adjacent the levers to engage the same and hold them in engaging positions, and manually operable means to disengage the dogs simultaneously.

ERNEST F. HARTWICK.